US006328295B1

(12) United States Patent
Hanks

(10) Patent No.: US 6,328,295 B1
(45) Date of Patent: Dec. 11, 2001

(54) ALIGNMENT TOOL

(76) Inventor: Ronald G. Hanks, 5625 S. Augusta, Seattle, WA (US) 98178

(*) Notice: Subject to any disclaimer, the term of this patent is extended or adjusted under 35 U.S.C. 154(b) by 0 days.

(21) Appl. No.: 09/643,988

(22) Filed: Aug. 22, 2000

Related U.S. Application Data

(60) Provisional application No. 60/150,176, filed on Aug. 23, 1999.

(51) Int. Cl.[7] .......... B23Q 3/08
(52) U.S. Cl. .......... 269/130; 81/64; 81/3.43
(58) Field of Search .......... 81/64, 3.43, 302; 269/30; 7/14.25

(56) References Cited

U.S. PATENT DOCUMENTS 627,489 * 6/1899 Ekstrand .......... 81/64
1,310,232 * 7/1919 Albaum .......... 81/3.43
1,521,342 * 12/1924 Thomas .......... 81/64
1,546,977 * 7/1925 Fletcher .......... 81/64
3,964,115 * 6/1976 Platek .......... 81/3.43

FOREIGN PATENT DOCUMENTS

01444216 * 2/1980 (DE) .......... 81/64
2428505 * 2/1980 (FR) .......... 81/3.43

* cited by examiner

*Primary Examiner*—Joseph J. Hail, III
*Assistant Examiner*—Daniel Shanley
(74) *Attorney, Agent, or Firm*—Joan H. Pauly

(57) ABSTRACT

First and second handles of a tool are spring biased to pivot into a closed position in which mounting end portions of the handles abut each other. A band has a first end attached to the mounting end portion of the first handle and extends therefrom to form a loop. The opposite end of the band is slidably received through passages through the mounting end portions of the handles. A series of openings through the band correspond to various predetermined use diameters. A pin extending into the passage in the second handle engages one of the openings corresponding to a selected use diameter. The gripping end portions of the handles opposite the mounting end portions are squeezed together to increase the effective diameter of the band loop and allow the loop to be placed around parts to be aligned.

8 Claims, 3 Drawing Sheets

FIG. 1
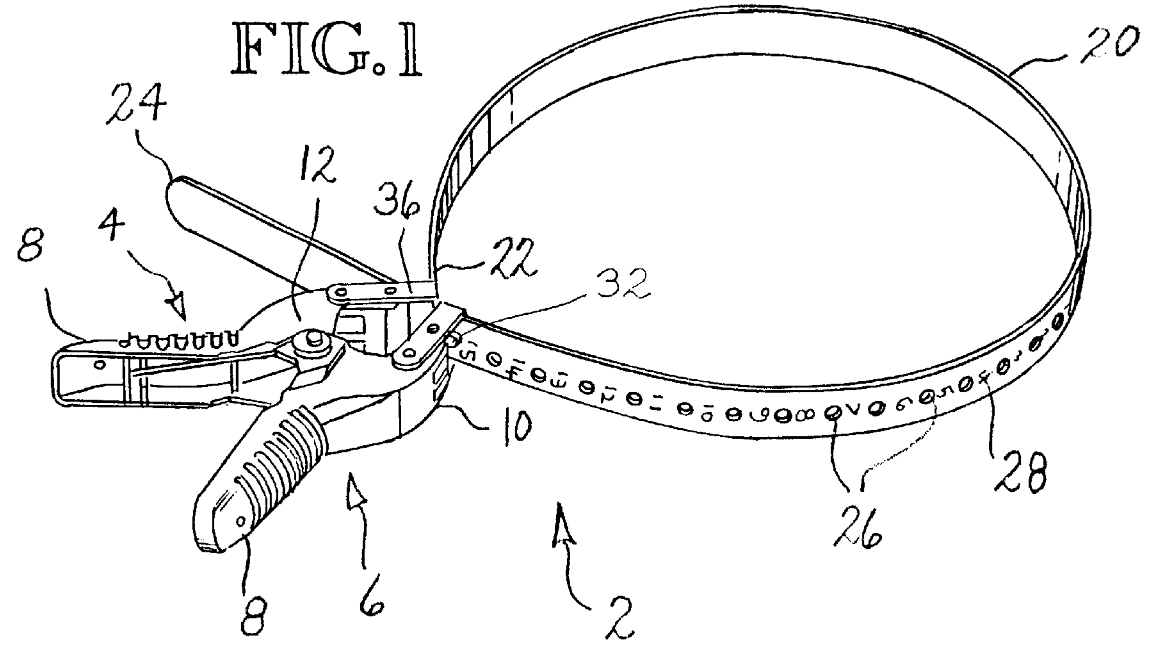
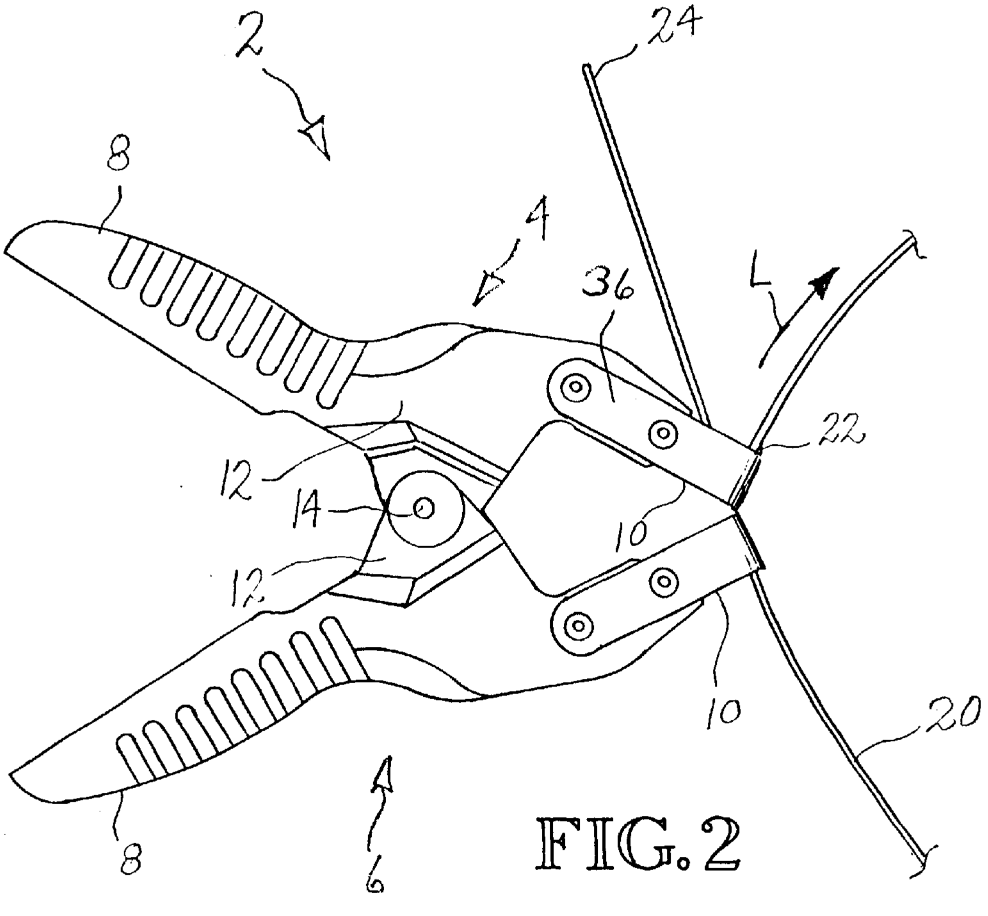
FIG. 2

ALIGNMENT TOOL

RELATED APPLICATION

This application claims priority to provisional application Ser. No. 60/150,176, filed Aug. 23, 1999.

TECHNICAL FIELD

This invention relates to tools for aligning circular parts and, more particularly, to an alignment tool having an adjustable diameter band with sizing openings corresponding to a plurality of use diameters, said openings being engageable by a sizing pin.

BACKGROUND INFORMATION

Automotive transmission pumps typically include two parts, sometimes referred to as the body and the stator, that have a circular plan configuration and fastener openings to receive fasteners to bolt the parts to each other. After a pump has been disassembled, reassembly requires precise positioning of the two parts with respect to each other before the bolts are tightened so that the pump will properly fit into its casing to ensure proper installation of the pump. Conventional methods for aligning the parts tend to be cumbersome and time consuming. An alignment tool that is easier to operate is marketed by Southeast Worldwide Manufacturers. This tool provides relative ease of operation but has the disadvantage of being suitable for only a single diameter size of transmission pump. Since pump diameter tends to vary considerably from automotive manufacturer to manufacturer and from model to model, maintaining a separate tool for each size pump is a significant disadvantage.

SUMMARY OF THE INVENTION

The invention provides a tool that is capable of aligning parts having a plurality of diameters. According to an aspect of the invention, the tool comprises first and second handles. Each handle has a gripping end portion, an opposite mounting end portion, and a mid portion between the gripping end portion and the mounting end portion. The mid portions of the two handles are pivotally secured to each other to secure the handles to each other. A spring biases the handles into a closed position in which the mounting end portions abut each other and the gripping end portions are spaced from each other. The tool also includes a band having a length extending between a first end and a second opposite end. The first end is secured to the mounting end portion of the first handle. The band has a series of openings extending therethrough and spaced from each other along the length. Each opening has a position chosen to correspond to a predetermined use diameter of the band. A sizing pin is carried by the mounting end portion of the second handle. The pin is positioned to engage any one of the openings. The handles are movable into an open position by squeezing the gripping end portions together to move the pin away from the first end of the band. This allows the band to be placed around two parts having a diameter essentially equal to the use diameter corresponding to the opening engaged by the pin. The series of openings and sizing pin enable the tool to align parts having a plurality of diameters.

A preferred feature of the tool is the provision of sizing indicia. The band has an outer face that forms an outer circumferential surface when the band is formed into a loop and the pin is engaging one of the openings. The sizing indicia are on the outer circumferential surface and represent a use diameter for each of the openings. This feature contributes to ease and efficiency of use of the tool. It helps a user consistently choose the right opening for a particular pump without wasting time correcting errors in choice.

In the preferred embodiment, the mounting end portion of each handle has a slide passage extending therethrough. The slide passages are positioned to receive the second end of the band therethrough. The band extends first through the passage of the second handle and then through the passage of the first handle to form the band into a loop. In the preferred configuration, the pin projects into the passage of the second handle.

Although the tool may be used for aligning parts of various types of devices, it is contemplated that at least its primary use will be in the alignment of the two parts of a transmission pump. According to another aspect of the invention, the tool has the characteristics described above. In addition, each use diameter corresponding to an opening is essentially equal to a diameter of a particular predesignated transmission pump.

BRIEF DESCRIPTION OF THE DRAWINGS

In the drawings, like element designations refer to like parts throughout, and:

FIG. 1 is a pictorial view of the preferred embodiment of the invention.

FIG. 2 is a plan view of the tool shown in FIG. 1.

DETAILED DESCRIPTION OF THE INVENTION

Figure 4:
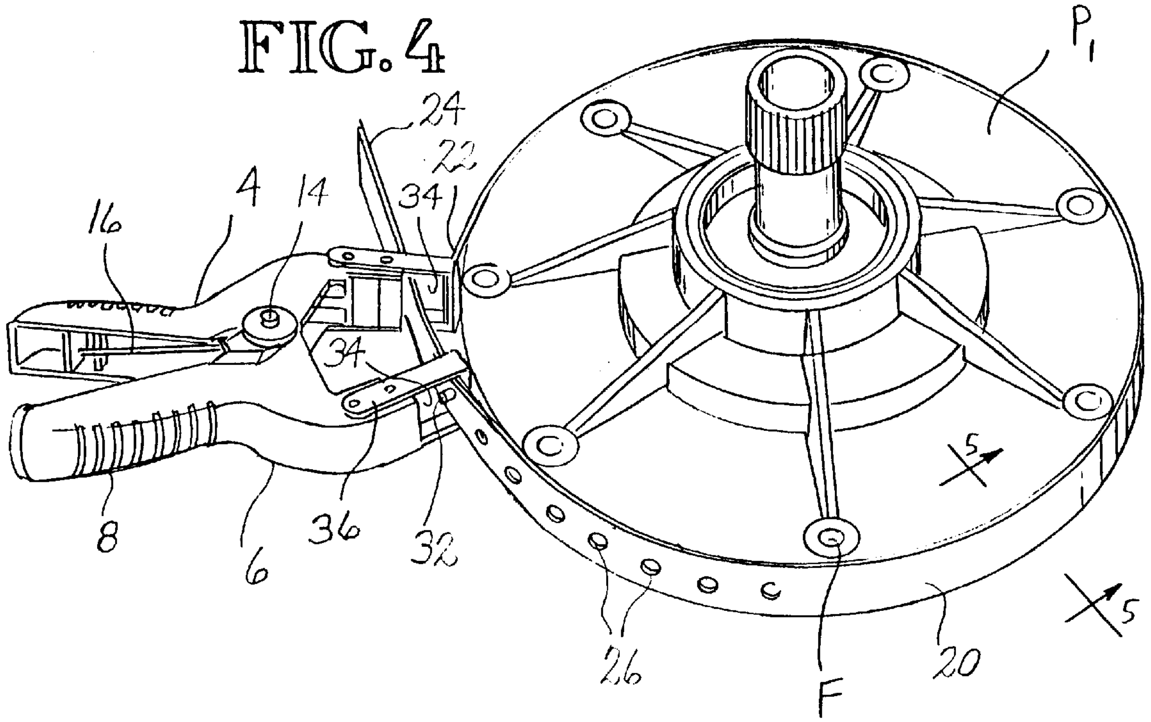
FIG. 4 is a pictorial view of the tool being used to align the parts of a transmission pump.
Figure 5:
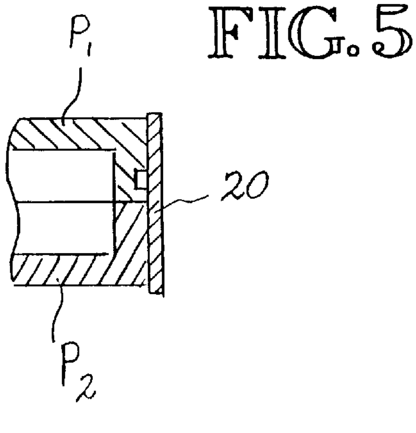
FIG. 5 is a fragmentary sectional view taken along the line 5—5 of FIG. 4.

The drawings show an alignment tool 2 that is constructed according to the invention and that constitutes the best mode for carrying out the invention currently known to the applicant. FIGS. 4 and 5 illustrate the tool 2 being used to align the body $P_2$ and stator $P_1$ of a transmission pump. It is anticipated that this will be the primary use of the tool of the invention. However, it is intended to be understood that the tool may also be used for aligning the parts of various other types of devices in which the parts have a common circular plan configuration and fastener openings for receiving fasteners to secure the parts to each other.

Referring to the drawings, the tool 2 comprises first and second handles 4, 6. Each handle 4, 6 has a gripping end portion 8, an opposite mounting end portion 10, and a mid portion 12 between the gripping end portion 8 and the mounting end portion 10. The mid portions 12 of the two handles 4, 6 are pivotally secured to each other to secure the handles 4, 6 to each other. As shown in FIGS. 1–4, the pivot connection includes a pivot pin 14.

Figure 3:
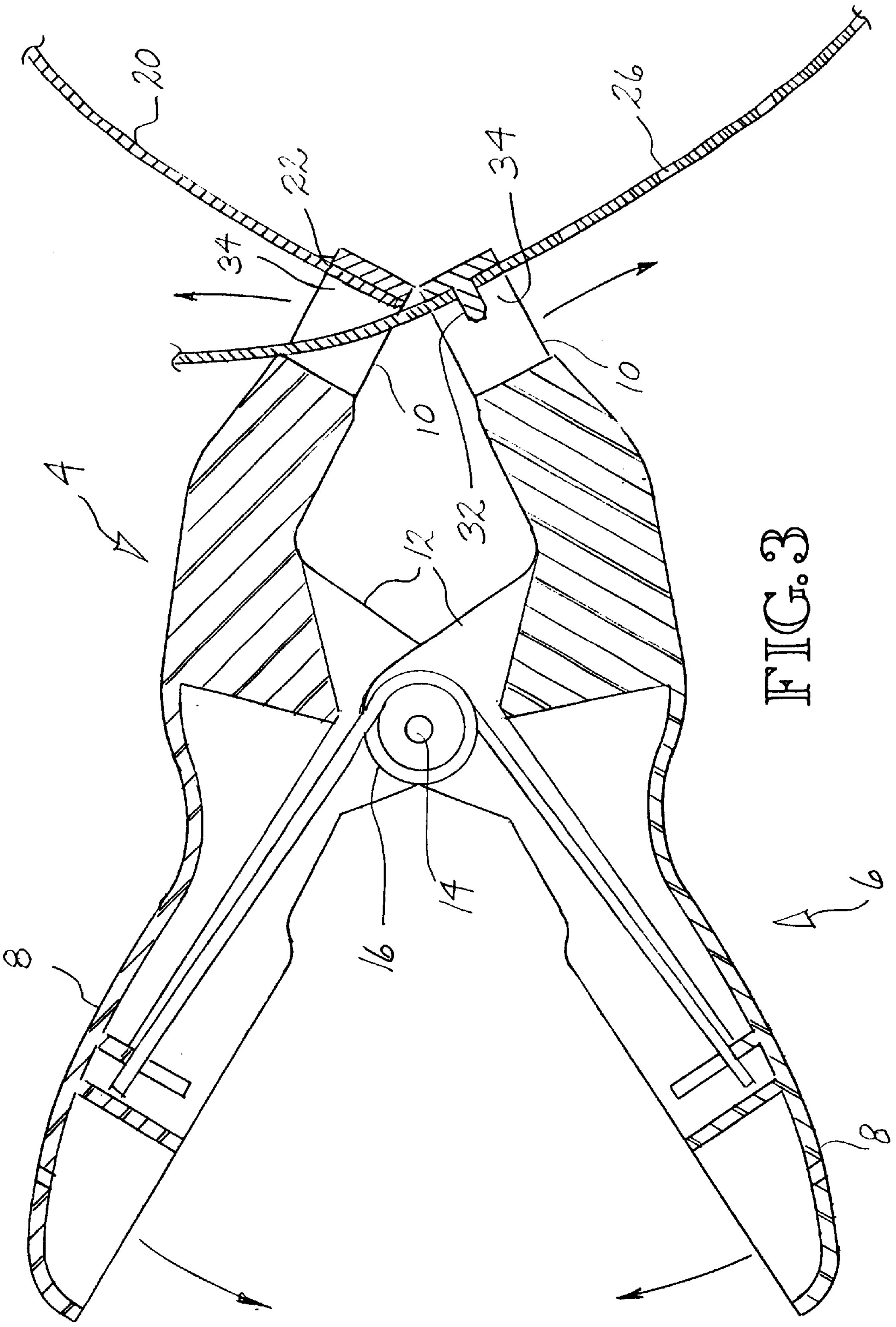
FIG. 3 is an enlarged sectional view of the tool shown in FIG. 2 with portions of the band cut away.

The handles 4, 6 are biased to pivot about the pivot pin 14 into a closed position, shown in FIGS. 1–3. In the closed position, the mounting end portions 10 of the handles 4, 6 abut each other. The gripping end portions 8 are spaced from each other. The biasing is accomplished by means of a spring 16, best seen in FIG. 3.

The tool 2 also includes a band 20 having a length L extending between a first end 22 and an opposite second end 24. The first end 22 is secured to the mounting end portion 10 of the first handle 4. This attachment may be accomplished by various means, such as by welding. The band 20 has a series of openings 26 extending therethrough and spaced from each other along the length L of the band 20. The openings 26 can be seen in FIGS. 1, 3, and 4. The length L is referenced by the arrow L in FIG. 2. Each opening 26 has a position chosen to correspond to a predetermined use diameter of the band 20. When the band is designed for its anticipated use, each use diameter is essentially equal to the diameter of a particular predesignated transmission pump.

An important feature of the invention is a sizing pin 32 carried by the mounting end portion 10 of the second handle 6. The pin 32 is positioned to engage any one of the openings 26. Engagement of the pin 32 in an opening 26 is best seen in FIGS. 1, 3, and 4. The details of the pin 32 and its positioning can be varied without departing from the spirit and scope of the invention.

As shown in the drawings, in the preferred embodiment, the mounting end portion 10 of each handle 4, 6 has a slide passage 34 extending therethrough. The slide passage 34 is formed by a U-shaped bracket 36 that is secured to the main body of the corresponding handle 4, 6. The bracket 36 forms the mounting end portion 10 of the handle 4, 6, and the bight or end wall of the bracket 36 is spaced from the handle body to define the passage 34 therebetween. This is best illustrated in FIGS. 3 and 4. The slide passages 34 are positioned to receive the second end 24 of the band 20 therethrough. As shown in FIGS. 1—4, the band 20 extends first through the passage 34 of the second handle 6 and then through the passage 34 of the first handle 4. This forms the band 20 into a loop for engaging parts to be aligned. In the preferred embodiment, the sizing pin 32 is secured to the inside surface of the bight portion of the bracket 36 on the second handle 6 and projects therefrom into the passage 34. The positioning of the pin 32 and band 20 in the passage 34 enables engagement of any one of the openings 26 in the band 20 by the pin 32.

A preferred feature of the invention is the provision of sizing indicia 28 on the band 20. These indicia 28 are illustrated in FIG. 1. The band 20 has an outer face that forms an outer circumferential surface when the band 20 is formed into a loop and the pin 32 is engaging one of the openings 26, as shown.in FIGS. 1—3. The sizing indicia 28 are on the outer circumferential surface and represent the use diameter for each of the openings 26.

The handles 4, 6 are movable into an open position, illustrated in FIG. 4. To open the handles 4, 6, the gripping end portions 8 are squeezed together to move the pin 32 away from the first end 22 of the band 20. This increases the effective diameter of the loop formed by the band 20 to allow the band 20 to be placed around two parts having a diameter essentially equal to the use diameter corresponding to the opening 26 engaged by the pin 32.

The tool 2 is designed for use to align parts having a plurality of diameters. The series of openings 26 and the sizing pin 32 provide this capability. The tool 2 has the potential to be capable of aligning any diameter transmission pump. All that is required is to have an opening. 26 corresponding to each possible pump diameter. As required, sizing openings 26 can be added to the band 20 of an existing tool 2. The only limitation is the length L of the band 20.

The use of the tool 2 to align the stator $P_1$. and body $P_2$ of a transmission pump is illustrated in FIGS. 4 and 5. Initially, the two pump parts $P_1$, $P_2$ are placed together in rough alignment. The appropriate sizing opening 26 corresponding to the diameter of the pump is selected, preferably by consulting a sizing sheet provided by the tool manufacturer. With the sizing hole number selected, the band 20 is pulled away from the sizing pin 32. The handles 4, 6 may be opened somewhat to facilitate freeing the band 20 from the pin 32. When the band 20 is free of the pin 32, it freely slides through the passages 34. The band 20 is slid to increase or decrease the diameter of the loop formed by the band 20 and bring the selected sizing opening 26 into a position in which it is aligned with the pin 32. When this is accomplished, the band 20 is released to allow the pin 32 to engage the opening 26. The end of the pin 32 may be tapered, as shown in FIG. 3, to help guide the pin 32 into the opening 26. Then, the handles 4, 6 are opened by squeezing the gripping end portions 8 together to increase the effective diameter of the loop formed by the band 20. This allows the band 20 to fit over the two parts of the pump $P_1$, $P_2$. At this point, the user should make sure that the band 20 will contact both halves $P_1$, $P_2$, as illustrated in FIG. 5.

When the correct positioning of the band 20 is confirmed, the user slowly releases his grip on the handles 4, 6. This simultaneously decreases the diameter of the band 20 and aligns the pump halves $P_1$, $P_2$. to each other with a constant and even pressure around the diameter of the pump. The decrease in diameter and pressure on the pump parts is produced by the spring pressure of the tool 2. The spring 16 biases the handles 4, 6 toward their closed position. When the handles 4, 6 have reached the position shown in FIG. 4, the alignment is complete. With complete alignment, the pump halves $P_1$, $P_2$ can be bolted together.

The bolts that secure the two pump halves $P_1$, $P_2$ together can be inserted into the fastener openings F in the pump halves $P_1$, $P_2$ prior to alignment. Following completion of alignment but before the tool 2 is removed from the pump assembly, the bolts are tightened.

The band 20 may be made from various materials. Presently, the preferred material is a springy steel, such as the type known as "half-hard stainless".

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A tool for aligning two parts having a common circular plan configuration and fastener openings for receiving fasteners to secure the parts to each other, comprising:

first and second handles each having a gripping end portion, an opposite mounting end portion, and a mid portion between said gripping end portion and said mounting end portion; said mid portions being pivotally secured to each other to secure said handles to each other, and said gripping end portions being sized to be grasped by a user;

a spring biasing said handles into a closed position in which said mounting end portions abut each other and said gripping end portions are spaced from each other;

a band having a length extending between a first end secured to said mounting end portion of said first handle and a second opposite end; said band having a series of openings extending therethrough and spaced from each other along said length, and each said opening having a position chosen to correspond to a predetermined use diameter of said band; and a sizing pin carried by said mounting end portion of said second handle and positioned to engage any one of said openings;

said handles being movable into an open position by squeezing said gripping end portions together to move said pin away from said first end of said band and allow said band to be placed around two parts having a diameter essentially equal to the use diameter corresponding to said any one of said openings engaged by said pin; and said series of openings and sizing pin enabling the tool to align parts having a plurality of diameters.

2. The tool of claim 1, wherein said band has an outer face that forms an outer circumferential surface when said band is formed into a loop and said pin is engaging one of said openings; and which comprises sizing indicia on said surface representing a use diameter for each said opening.

3. The tool of claim 1, wherein said mounting end portion of each said handle has a slide passage extending therethrough; said slide passages being positioned to receive said second end of said band therethrough, first through said passage of said second handle and then through said passage of said first handle, to form said band into a loop.

4. The tool of claim 3, wherein said pin projects into said passage of said second handle.

5. A tool for aligning two parts of a transmission pump, said parts having a common circular plan configuration and fastener openings for receiving fasteners to secure the parts to each other, comprising:

first and second handles each having a gripping end portion, an opposite mounting end portion, and a mid portion between said gripping end portion and said mounting end portion; said mid portions being pivotally secured to each other to secure said handles to each other, and said gripping end portions being sized to be grasped by a user;

a spring biasing said handles into a closed position in which said mounting end portions abut each other and said gripping end portions are spaced from each other;

a band having a length extending between a first end secured to said mounting end portion of said first handle and a second opposite end; said band having a series of openings extending therethrough and spaced from each other along said length, each said opening having a position chosen to correspond to a predetermined use diameter of said band, and each said use diameter being essentially equal to a diameter of a particular predesignated transmission pump; and a sizing pin carried by said mounting end portion of said second handle and positioned to engage any one of said openings;

said handles being movable into an open position by squeezing said gripping end portions together to move said pin away from said first end of said band and allow said band to be placed around two parts of a transmission pump having a diameter essentially equal to the use diameter corresponding to said any one of said openings engaged by said pin; and said series of openings and sizing pin enabling the tool to align parts having a plurality of diameters.

6. The tool of claim 5, wherein said band has an outer face that forms an outer circumferential surface when said band is formed into a loop and said pin is engaging one of said openings; and which comprises sizing indicia on said surface representing a use diameter for each said opening.

7. The tool of claim 5, wherein said mounting end portion of each said handle has a slide passage extending therethrough; said slide passages being positioned to receive said second end of said band therethrough, first through said passage of said second handle and then through said passage of said first handle, to form said band into a loop.

8. The tool of claim 7, wherein said pin projects into said passage of said second handle.

* * * * *